United States Patent
Mugunda et al.

(10) Patent No.: US 12,547,514 B2
(45) Date of Patent: Feb. 10, 2026

(54) BMC/MULTI-GPU MONITORING/MANAGEMENT SYSTEM

(71) Applicant: Dell Products L.P., Round Rock, TX (US)

(72) Inventors: Chandrasekhar Mugunda, Austin, TX (US); Rui An, Austin, TX (US); Dheeraj Butukuri, Cedar Park, TX (US); Aniruddha Herekar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 18/672,329

(22) Filed: May 23, 2024

(65) Prior Publication Data
US 2025/0363029 A1    Nov. 27, 2025

(51) Int. Cl.
  *G06F 11/30* (2006.01)
  *G06F 8/65* (2018.01)

(52) U.S. Cl.
  CPC ............ *G06F 11/3055* (2013.01); *G06F 8/65* (2013.01); *G06F 11/3075* (2013.01)

(58) Field of Classification Search
  CPC ..... G06F 8/65; G06F 11/3055; G06F 11/3075
  See application file for complete search history.

(56) References Cited

U.S. PATENT DOCUMENTS

| | | | |
|---|---|---|---|
| 10,996,942 B1* | 5/2021 | Bisa | G06F 9/4812 |
| 11,657,013 B2 | 5/2023 | Stevens et al. | |
| 2019/0045654 A1* | 2/2019 | Abbondanzio | H05K 7/1494 |
| 2023/0119437 A1* | 4/2023 | Faasse | G06F 1/3278 |
| | | | 713/300 |
| 2023/0120652 A1* | 4/2023 | Stevens | G06F 9/4406 |
| | | | 710/313 |

* cited by examiner

*Primary Examiner* — Eric T Oberly
(74) *Attorney, Agent, or Firm* — Joseph Mencher

(57) ABSTRACT

A Baseboard Management Controller (BMC)/multi-Graphics Processing Unit (GPU) monitoring/management system includes a computing device having a GPU system with a plurality of GPUs, and a BMC device coupled to the GPU system via a Universal Serial Bus-Network Interface Controller (USB-NIC) path and an Inter-Integrated Circuit (I2C) path. The BMC device performs first log collection operations and inventory operations via the USB-NIC path with the GPU system during initialization of the computing device. During runtime of the computing device that follows the initialization of the computing device, the BMC device performs sensor monitoring operations with the GPU system via the I2C path. During runtime of the computing device, the BMC device performs second log collection operations with the GPU system via the USB-NIC path, and will perform firmware update operations with the GPU system via the USB-NIC path in response to receiving a firmware update request.

20 Claims, 17 Drawing Sheets

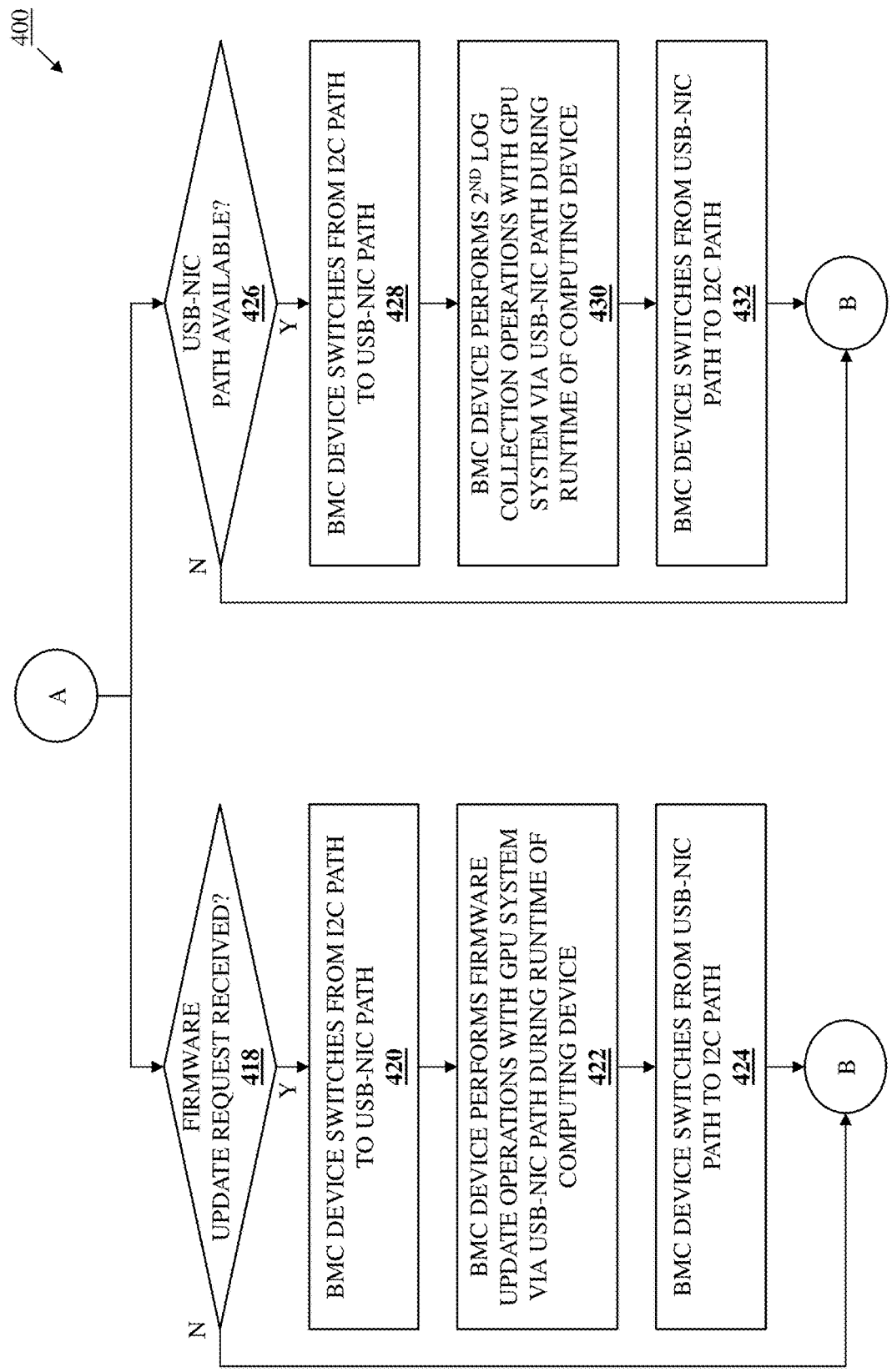

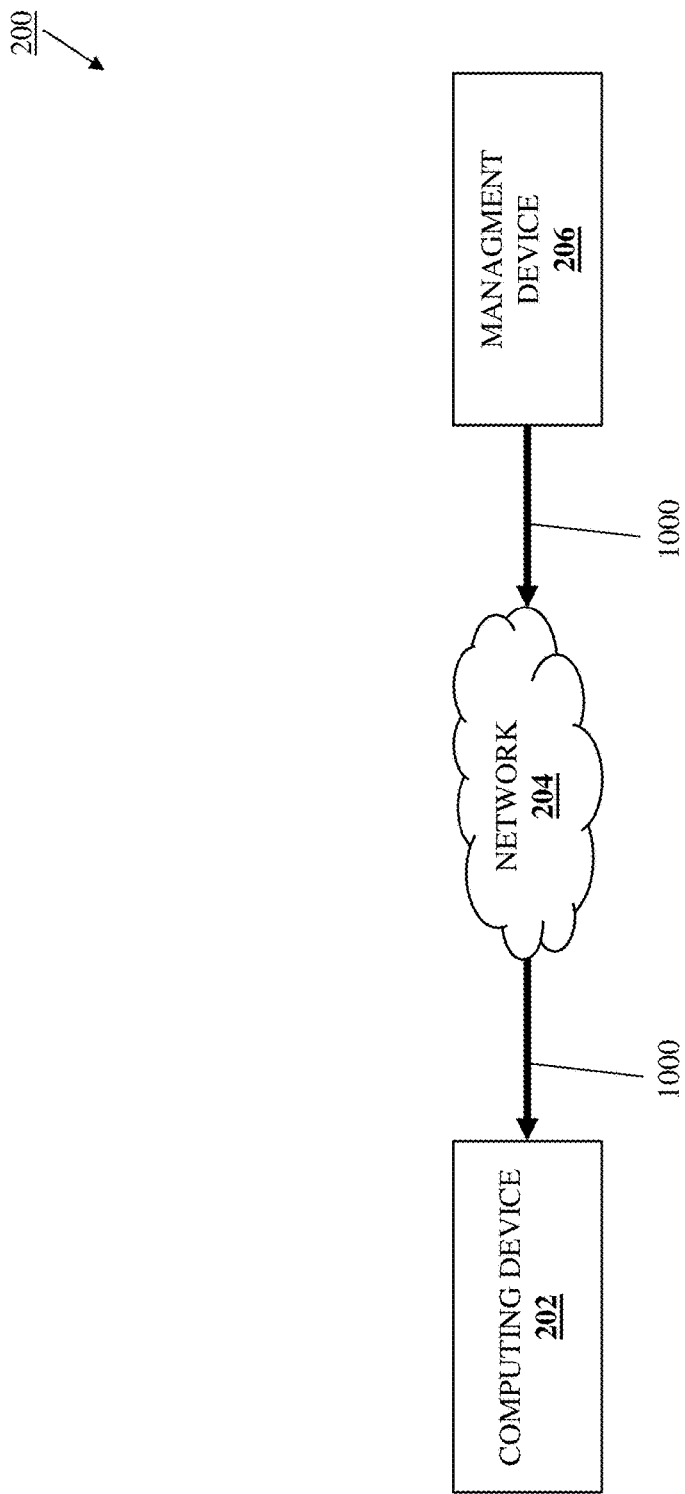

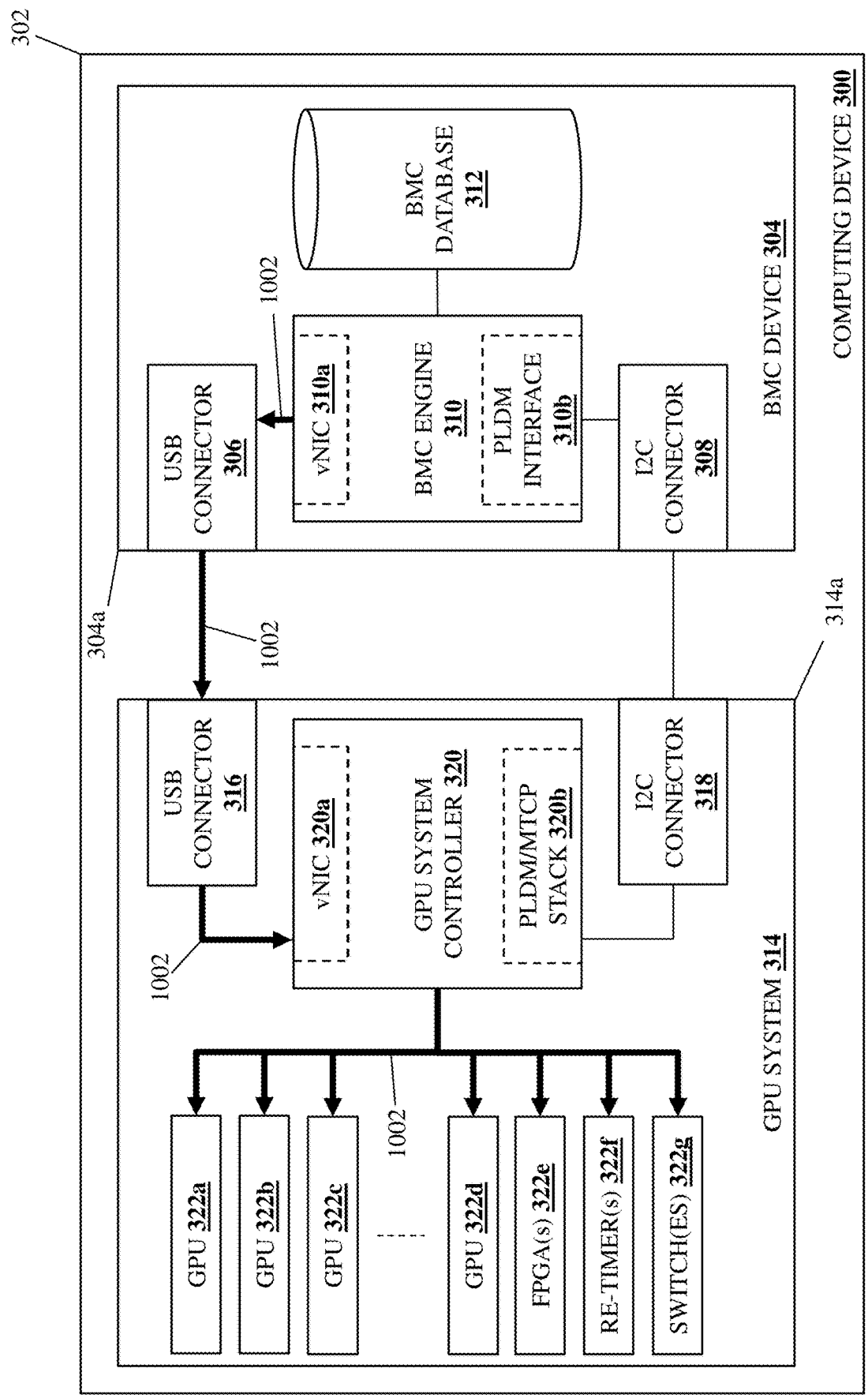

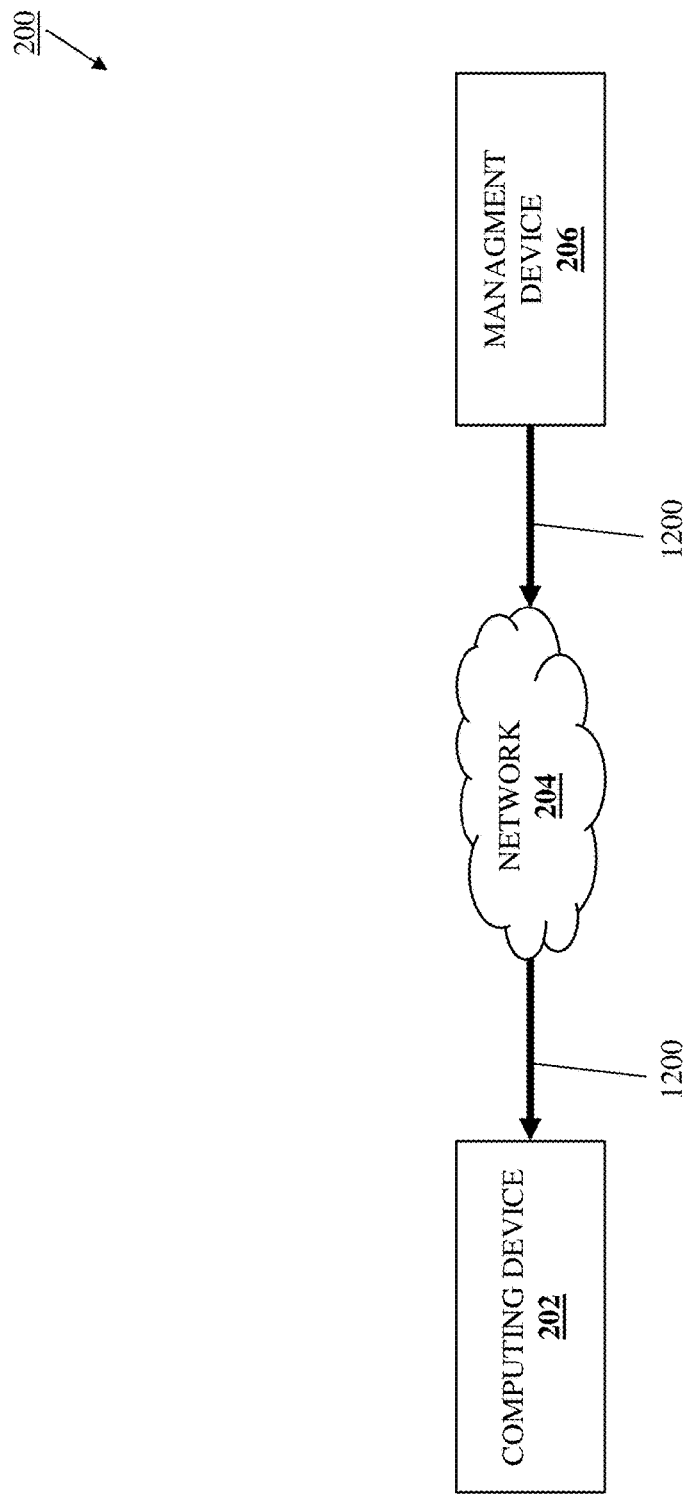

BMC/MULTI-GPU MONITORING/MANAGEMENT SYSTEM

BACKGROUND

The present disclosure relates generally to information handling systems, and more particularly to monitoring and managing multiple Graphics Processing Units (GPUs) using a Baseboard Management Controller (BMC) in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, are sometimes provided with GPU/accelerator systems (e.g., the SXM5 H100 GPU/accelerator system available from NVIDIA® corporation of Santa Clara, California, United States) for use in Artificial Intelligence applications, Machine Learning (ML) applications, and/or other GPU/accelerator system applications known in the art. Furthermore, Baseboard Management Controller (BMC) devices such as the integrated DELL® Remote Access Controller (iDRAC) provided in server devices available from DELL® Inc. of Round Rock, Texas, United States may be provided in those computing devices for use in monitoring and managing such GPU/accelerator systems. However, GPU/accelerator system providers are continually enhancing the telemetry and health status data provided for GPUs and other devices on such GPU/accelerator systems, which raises issues with the monitoring and management performed by conventional BMC devices.

For example, BMC devices like those discussed above are provided with two management paths to the GPU system controller: a "fast" Universal Serial Bus-Network Interface Controller (USB-NIC) path and a "legacy" Inter-Integrated Circuit (I2C) path. The "fast" USB-NIC path includes USB connections with virtual NICs and uses communications via the REDFISH protocol, while the "legacy" I2C path is intended primarily for limited data transfer and recovery purposes. However, the "fast" USB-NIC path is not exclusively dedicated to (and thus not consistently available for) GPU system monitoring and management operations by the BMC device, as the BMC device also handles the monitoring and management of other components in the computing device. As such, conventional BMC devices are configured to only use the "fast" USB-NIC path for firmware update operations, while performing all other monitoring and management operations using the "legacy" I2C path, which the inventors of the present disclosure have recognized significantly reduces the functionality available to the BMC device via the "fast" USB-NIC path.

Accordingly, it would be desirable to provide BMC/multi-GPU monitoring/management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Baseboard Management Controller (BMC) engine that is configured to: perform, during initialization of a computing device that includes the processing system and via a Universal Serial Bus-Network Interface Controller (USB-NIC) path, first log collection operations and inventory operations with a Graphics Processing Unit (GPU) system that is included in the computing device, that is coupled to the processing system, and that includes a plurality of GPUs; perform, during runtime of the computing device following the initialization of the computing device and via an Inter-Integrated Circuit (I2C) path, sensor monitoring operations with the GPU system; perform, during runtime of the computing device via the USB-NIC path and in response to receiving a firmware update request, firmware update operations with the GPU system; and perform, during runtime of the computing device via the USB-NIC path, second log collection operations with the GPU system.

BRIEF DESCRIPTION OF THE DRAWINGS

FIG. 4B is a flow chart illustrating an embodiment of a portion of a method for monitoring/managing multiple GPUs using a BMC device.

FIG. 10A is a schematic view illustrating an embodiment of the networked system of FIG. 2 operating during the method of FIG. 4.

FIG. 10B is a schematic view illustrating an embodiment of the computing device of FIG. 2 operating during the method of FIG. 4

FIG. 12A is a schematic view illustrating an embodiment of the networked system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
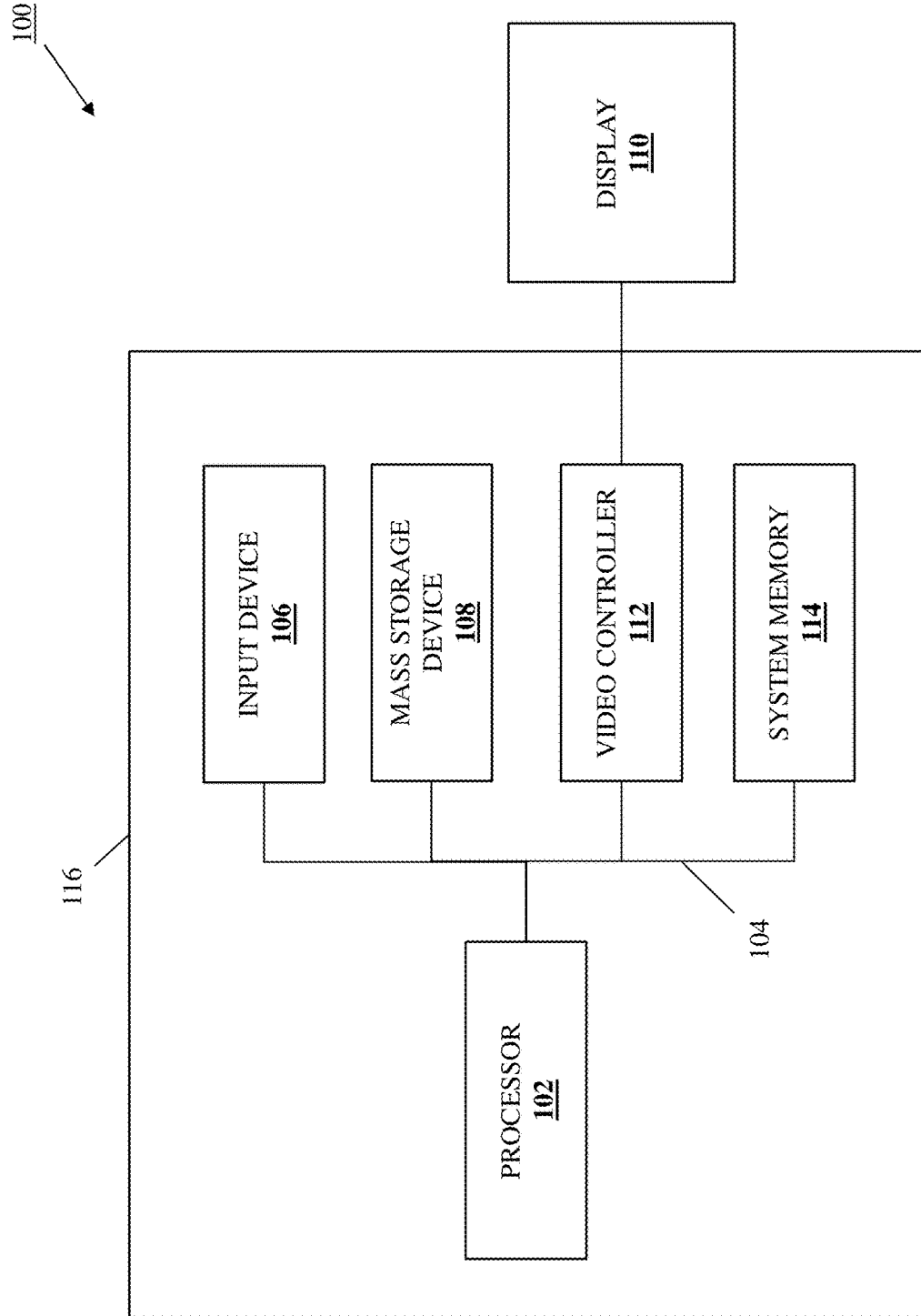
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
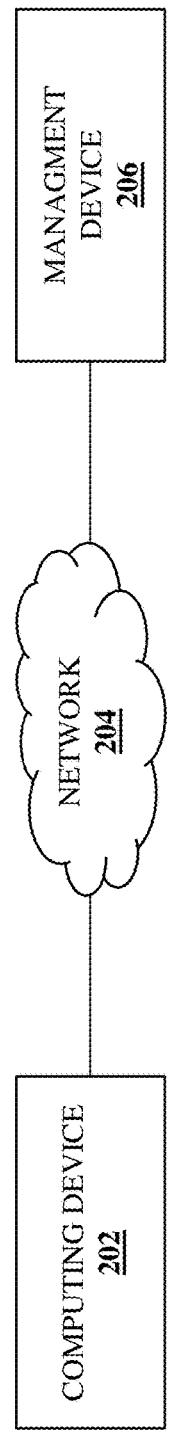
FIG. 2 is a schematic view illustrating an embodiment of a networked system that may include the BMC/multi-GPU monitoring/management system of the present disclosure.

Referring now to FIG. 2, an embodiment of a networked system 200 is illustrated that may include the BMC/multi-GPU monitoring/management system of the present disclosure. In the illustrated embodiment, the networked system 200 includes a computing device 202. In an embodiment, the computing device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that devices including the BMC/multi-GPU monitoring/management system of the present disclosure may include any computing devices that may be configured to operate similarly as the computing device 202 discussed below.

In the illustrated example, the computing device 202 is coupled to a network 204 that may be provided by a Local Area Network (LAN), the Internet, combinations thereof, and/or any other network that would be apparent to one of skill in the art in possession of the present disclosure. Furthermore, a management device 206 may be coupled to the network 204. In an embodiment, the management device 206 may be provided by the IHS 100 discussed above with reference to FIG. 1, and/or may include some or all of the components of the IHS 100, and in specific examples may be provided by a desktop computing device, a laptop/notebook computing device, a tablet computing device, a mobile phone, and/or other computing devices known in the art. However, while illustrated and discussed as being provided by a particular computing devices, one of skill in the art in possession of the present disclosure will recognize that management devices included in the networked system 200 of the present disclosure may include any computing devices that may be configured to operate similarly as the management device 206 discussed below. Furthermore, while a specific networked system 200 has been illustrated and described, one of skill in the art in possession of the present disclosure will recognize that the networked system of the present disclosure may include a variety of components and component configurations while remaining within the scope of the present disclosure as well.

Figure 3:
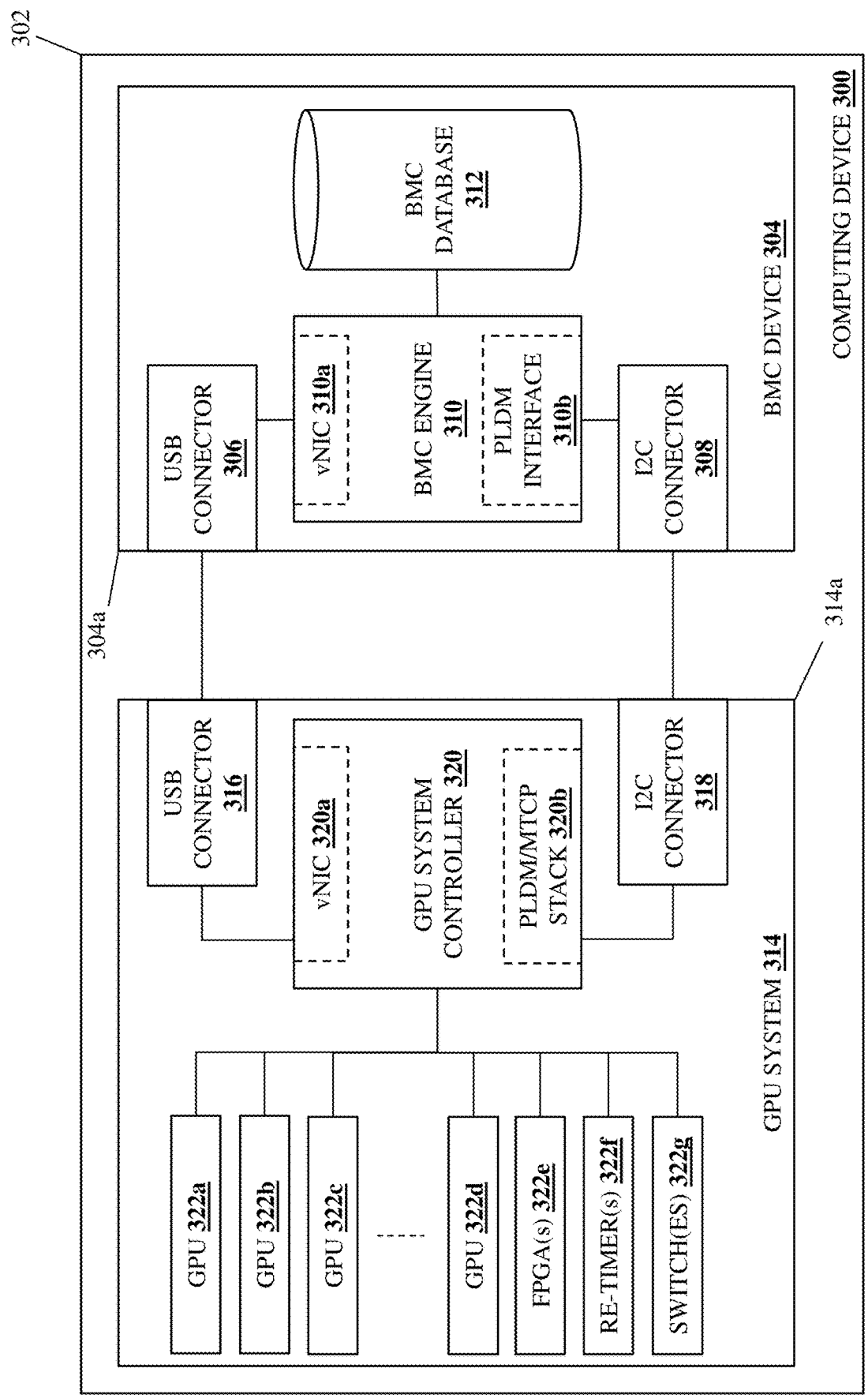
FIG. 3 is a schematic view illustrating an embodiment of a computing device that may be included in the networked system of FIG. 2 and that may provide the BMC/multi-GPU monitoring/management system of the present disclosure.

Referring now to FIG. 3, an embodiment of a computing device 300 is illustrated that may provide the computing device 202 discussed above with reference to FIG. 2. As such, the computing device 300 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the computing device 300 discussed below may be provided by other types of computing devices that are configured to operate similarly as the computing device 300 discussed below.

In the illustrated embodiment, the computing device 300 includes a chassis 302 that houses the components of the computing device 300, only some of which are illustrated and described below. For example, the chassis 302 of the computing device 300 may house BMC device 304 that may be provided by the integrated DELL® Remote Access Controller (iDRAC) provided in server devices available from DELL® Inc. of Round Rock, Texas, United States, as well as any other BMC devices that would be apparent to one of skill in the art in possession of the present disclosure. As such, one of skill in the art in possession of the present disclosure will appreciate how the BMC device 304 may be configured to provide an out-of-band management platform that includes mostly separate resources from the computing device 300 that are configured to provide a browser-based interface or Command Line Interface (CLI) for managing and monitoring components in the computing device 200.

In the illustrated embodiment, the BMC device 304 includes a chassis 304a (e.g., a circuit board) that supports the components of the BMC device 304, only some of which are illustrated and described below. For example, the chassis 304a of the BMC device 304 may support a Universal Serial Bus (USB) connector 306 that, as described below, may be configured to provide the USB-Network Interface Controller (USB-NIC) path discussed below. Furthermore, the chassis 304a of the BMC device 304 may also support an Inter-Integrated Circuit (I2C) connector 308 that, as described below, may be configured to provide the I2C path discussed below.

The chassis 304a of the BMC device 304 may also support a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 310 that is configured to perform the functionality of the BMC engines and/or BMC devices discussed below. As illustrated in FIG. 3, the BMC engine 310 may be configured to provide a virtual NIC (vNIC) 310a that, as described below, may be coupled to the USB connector 306 (e.g., via a coupling between the BMC processing system and the USB connector 306) and configured to provide the USB-NIC path with the GPU system 314 discussed below. Furthermore, as also illustrated in FIG. 3, the BMC engine 310 may be configured to provide a Platform Level Data Model (PLDM) interface 310b that, as described below, may be coupled to the I2C connector 308 (e.g., via a coupling between the BMC processing system and the I2C connector 308) and configured to provide the I2C path with the GPU system 314 discussed below. However, while the BMC engine 310 is illustrated and described as providing particular communication elements (i.e., the vNIC 310a and the PLDM interface 310b) in the specific examples discussed below, one of skill in the art in possession of the present disclosure will appreciate how the BMC engine 310 may enable the functionality described below using other communication elements while remaining within the scope of the present disclosure as well.

The chassis 304a of the BMC device 304 may also house a BMC storage system (not illustrated, but which may be similar to the storage 108 discussed above with reference to FIG. 1) that is coupled to the BMC engine 310 (e.g., via a coupling between the BMC storage system and the BMC processing system) and that includes a BMC database 312 that is configured to store any of the information utilized by the BMC engine 310 discussed below. While not illustrated or described in detail, one of skill in the art in possession of the present disclosure will appreciate how the BMC engine 304 may be coupled to a communication system (e.g., a communication system supported by the chassis 304a of the BMC device 304 and/or housed in the chassis 302 of the computing device 300) that may be provided by a Network Interface Controller (NIC), wireless communication systems (e.g., BLUETOOTH®, Near Field Communication (NFC) components, WiFi components, etc.), and/or any other communication components that one of skill in the art in possession of the present disclosure would recognize as providing the BMC communication functionality (e.g., the out-of-band communication functionality) described herein.

In the illustrated embodiment, the chassis 302 of the computing device 300 also houses a Graphics Processing Unit (GPU) system 314. In the specific examples provided below, the GPU system 314 may be provided by a GPU/accelerator systems such as the SXM5 H100 GPU/accelerator system available from NVIDIA® corporation of Santa Clara, California, United States, although one of skill in the art in possession of the present disclosure will appreciate how other GPU systems will fall within the scope of the present disclosure as well. Furthermore, while described as being utilized with a GPU system having multiple GPUs, one of skill in the art in possession of the present disclosure will appreciate how the BMC/multi-GPU monitoring/management system of the present disclosure may be adapted to allow monitoring and/or management by the BMC device of other computing components that are configured similarly as the GPU system 314 discussed below while remaining within the scope of the present disclosure as well.

In the illustrated embodiment, the GPU system 314 includes a chassis 314a that houses and/or supports the components of the GPU system 314, only some of which are illustrated and described below. For example, the chassis 314a of the GPU system 314 may house or support a USB connector 316 that, as described below, may be configured to provide the USB-NIC path with the BMC device 304 discussed below. Furthermore, the chassis 314a of the GPU system 314 may also house or support an I2C connector 318 that, as described below, may be configured to provide the I2C path with the BMC device 304 discussed below.

The chassis 314a of the GPU system 314 may also house or support a GPU system controller 320 that is configured to perform the functionality of the GPU systems controllers and/or GPU systems discussed below. As illustrated in FIG. 3, the GPU system controller 320 may be configured to provide a vNIC 320a that, as described below, may be coupled to the USB connector 316 (e.g., via a coupling between the GPU system controller 320 and the USB connector 316) and configured to provide the USB-NIC path with the BMC device 304 discussed below. Furthermore, as also illustrated in FIG. 3, the GPU system controller 320 may be configured to provide PLDM/Management Controller Transport Protocol (MCTP) stack 320b that, as described below, may be coupled to the I2C connector 318 (e.g., via a coupling between the GPU system controller 320 and the I2C connector 318) and configured to provide the I2C path discussed below that one of skill in the art in possession of the present disclosure provides for slower communications relative to the USB-NIC path provided between the BMC device 304 and the GPU system 314 as described herein. However, while the GPU system controller 320 is illustrated and described as providing particular communication elements (i.e., the vNIC 320a and the PLDM/MTCP stack 320b) in the specific examples discussed below, one of skill in the art in possession of the present disclosure will appreciate how the GPU system controller 320 may enable the functionality described below using other communication elements while remaining within the scope of the present disclosure as well.

As illustrated, the chassis 314a of the GPU system 314 may house or support a plurality of GPUs 322a, 322b, 322c, and up to 322d, one or more Field Programmable Gate Arrays (FPGAs) 322e, one or more re-timers 322f, one or more switches 322g, and/or any other GPU system components that would be apparent to one of skill in the art in possession of the present disclosure, and one of skill in the art in possession of the present disclosure will appreciate how the GPU system components illustrated in FIG. 3 provide the specific example of the NVIDIA® SXM5 H100 GPU/accelerator system discussed above that may include eight GPUs, as well as supporting components.

While not illustrated or described in detail, one of skill in the art in possession of the present disclosure will appreciate how the chassis 302 of the computing device 300 may include any of variety of components known in the art, and any of those components may be coupled to and monitored and managed using the BMC device 304. For example, the BMC engine 310 in the BMC device 304 and the GPU system controller 320 in the GPU system 314 may be configured to use the vNICs 310a and 320a, respectively, and the USB connectors 306 and 316, respectively, to provide the USB-NIC path described herein that enables monitoring and/or management of the GPU system 314 by the BMC device 304, and one of skill in the art in possession of the present disclosure will appreciate how the BMC engine 310 may be connected to the other component(s) in the computing device 300 via other USB-NIC paths provided using its vNIC 310a and the USB connector 306 in order to allow for the monitoring and/or management of those computing components by the BMC device 304 as well. Furthermore, the BMC engine 310 in the BMC device 304 and the GPU system controller 320 in the GPU system 314 may be configured to use the PLDM interface 310b and PLDM/MTCP stack 320b, respectively, and the I2C connectors 308 and 318, respectively, to provide the dedicated I2C path described herein between BMC device 304 and the GPU system 314 that enables monitoring and/or management of the GPU system 314 by the BMC device 304.

However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the BMC/multi-GPU monitoring/management functionality discussed below, while remaining within the scope of the present disclosure as well.

Figure 4A:
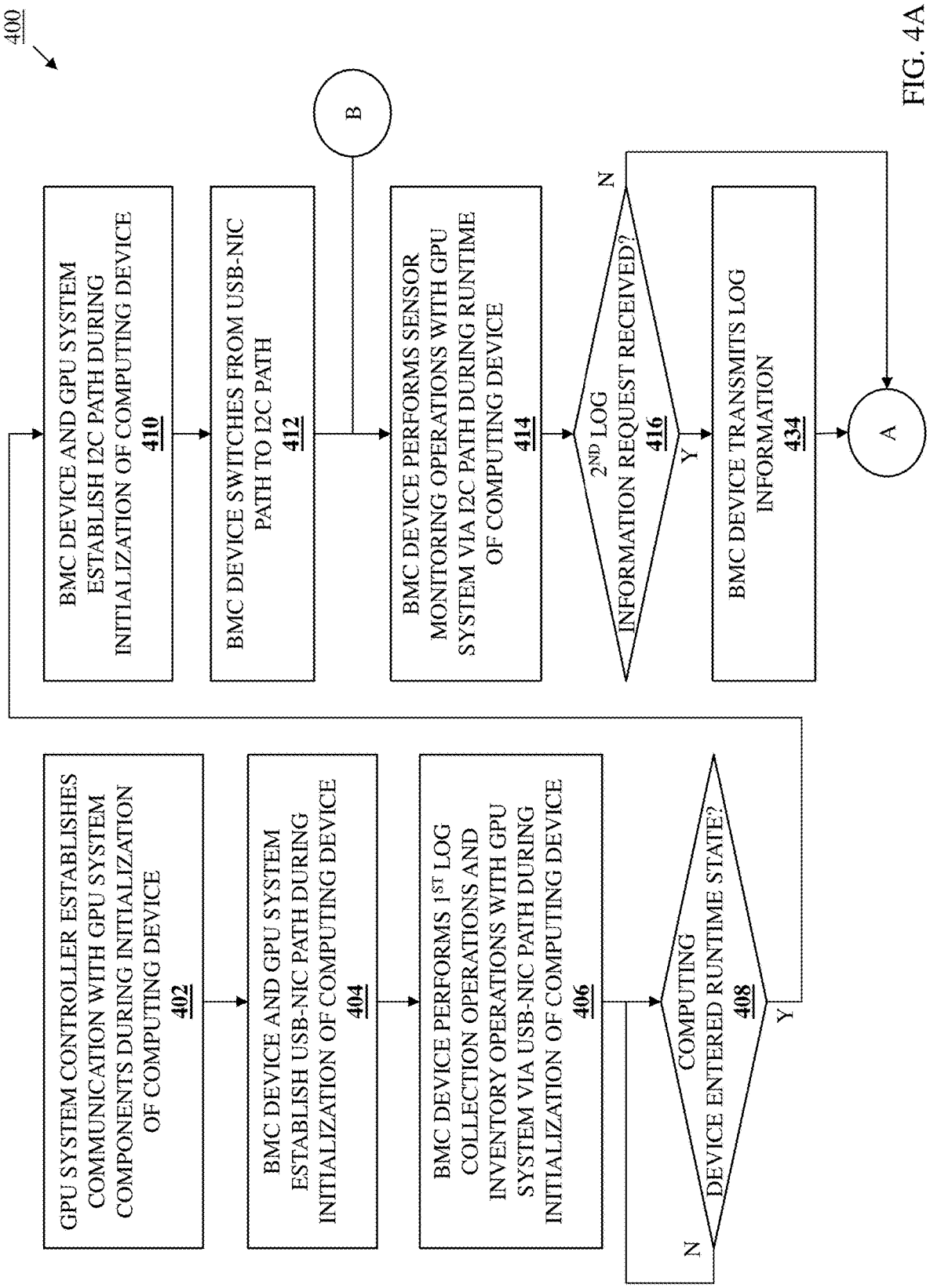
FIG. 4A is a flow chart illustrating an embodiment of a portion of a method for monitoring/managing multiple GPUs using a BMC device.

Referring now to FIGS. 4A and 4B, an embodiment of a method 400 for monitoring/managing multiple Graphics Processing Units (GPUs) using a Baseboard Management Controller (BMC) device is illustrated. As discussed below, the systems and methods of the present disclosure provide for the combined use of a USB-NIC path and an I2C path in the monitoring and/or management of a GPU system by a BMC device, with the USB-NIC path used for first log collection operations and inventory operations during initialization, the I2C path used for sensor monitoring operations during runtime, the USB-NIC path used for second log collection operations during runtime, and the USB-NIC path used for firmware update operations during runtime when a firmware update request is received. For example, the BMC/multi-GPU monitoring/management system may include a computing device having a GPU system with a plurality of GPUs, and a BMC device coupled to the GPU system via a USB-NIC path and an I2C path. The BMC device performs first log collection operations and inventory operations via the USB-NIC path with the GPU system during initialization of the computing device. During runtime of the computing device that follows the initialization of the computing device, the BMC device performs sensor monitoring operations with the GPU system via the I2C path. During runtime of the computing device, the BMC device performs second log collection operations with the GPU system via the USB-NIC path, and will perform firmware update operations with the GPU system via the USB-NIC path in response to receiving a firmware update request. As such, the USB-NIC path between the BMC device and the GPU system is utilized to enhance the monitoring and management of the GPU system by the BMC device.

Figure 5:
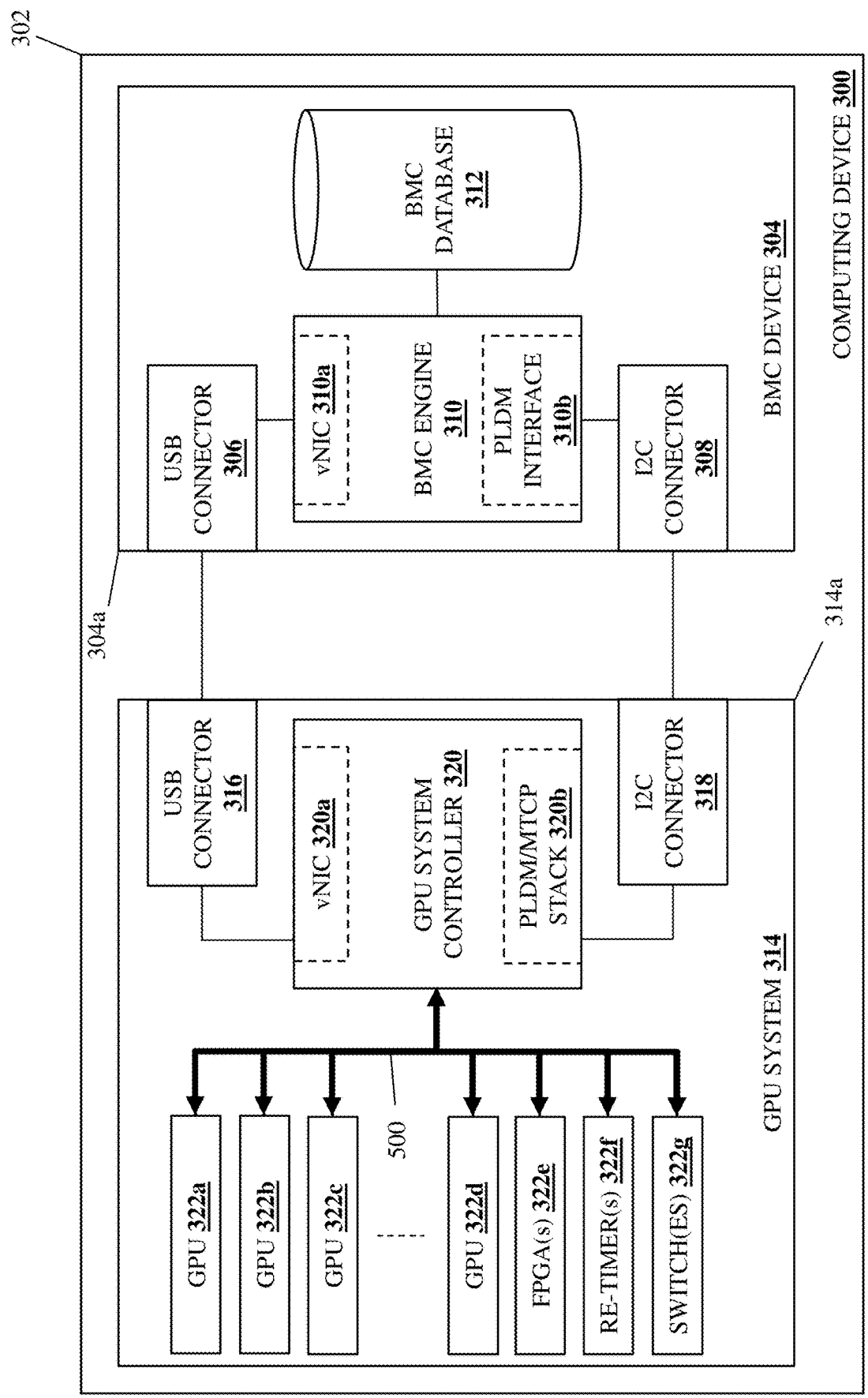
FIG. 5 is a schematic view illustrating an embodiment of the computing device of FIG. 2 operating during the method of FIG. 4.

The method 400 begins at block 402 where a GPU system controller establishes communications with GPU system components during initialization of a computing device. With reference to FIG. 5, in an embodiment of block 402, the computing device 300 may be powered-on (e.g., via Power-On Start-Up (POST) operations), reset, and/or otherwise initialized such that the computing device 300 performs boot operations and/or any other initialization operations known in the art, and as part of (or as a result of) those initialization operations for the computing device 300 the GPU system controller 320 may perform communication establishment operations 500 with the GPUs 322a-322d, the FPGA(s) 322c, the re-timer(s) 322f, the switch(es) 322g, and/or any other components in the GPU system 314, and one of skill in the art in possession of the present disclosure will appreciate how the communication establishment operations 500 may include any operations that enable the communications between the GPU system controller 320 and those components in the GPU system 314 described in further detail below.

Figure 6:
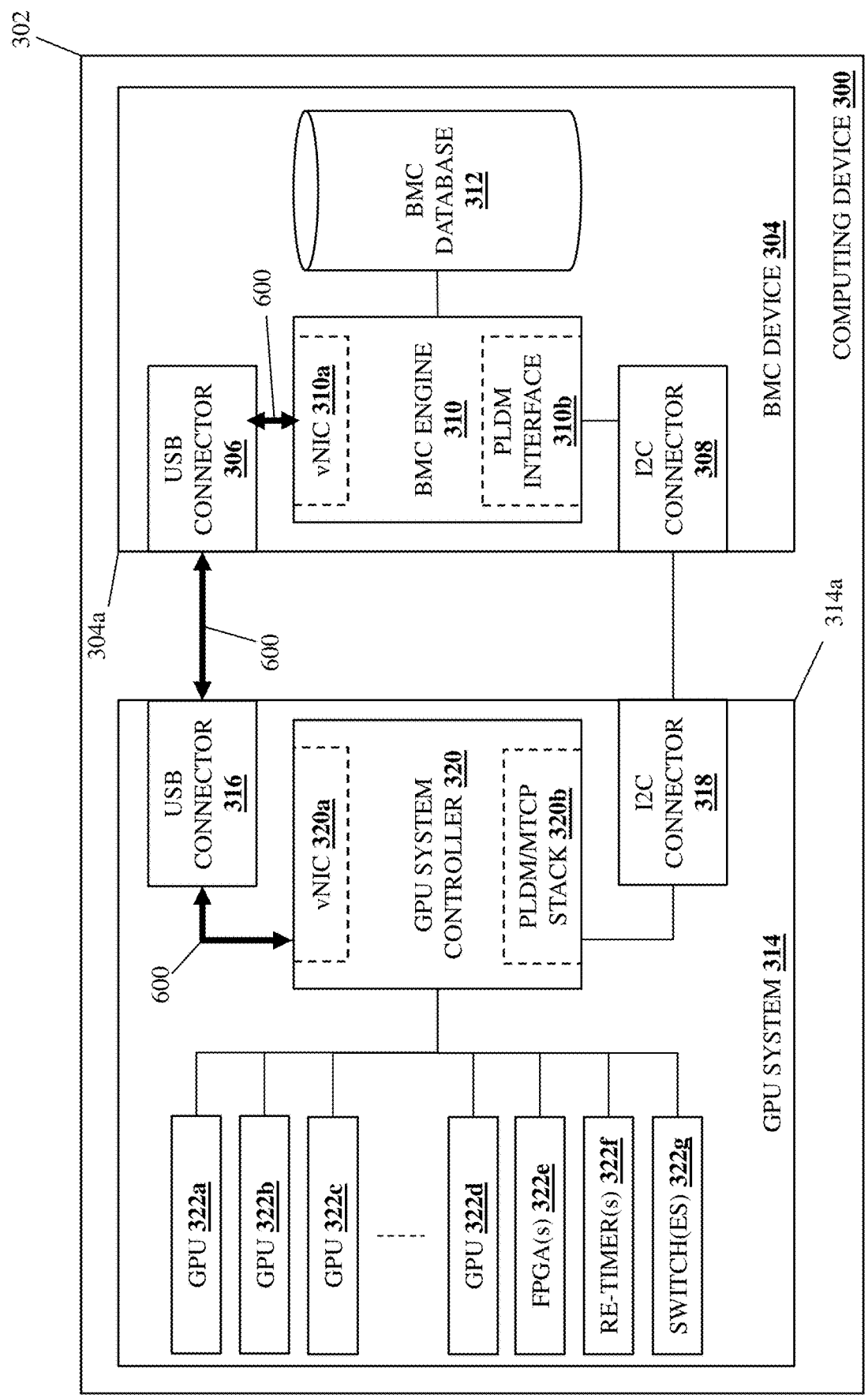
FIG. 6 is a schematic view illustrating an embodiment of the computing device of FIG. 2 operating during the method of FIG. 4.

The method 400 then proceeds to block 404 where a BMC device and the GPU system establish a USB-NIC path during initialization of the computing device. With reference to FIG. 6, in an embodiment of block 404, the BMC engine 310 in the BMC device 304 and the GPU system controller 320 in the GPU system 314 may perform USB-NIC path establishment operations 600 during the initialization operations for the computing device 300 that may include the BMC engine 310 providing the vNIC 310a, the GPU system controller 320 providing the vNIC 320a, and the BMC engine 310 and GPU system controller 320 configuring their vNICs 310a and 320a to provide the USB-NIC path via the USB connectors 306 and 316 that one of skill in the art in possession of the present disclosure will appreciate is a relatively "fast" communication path (i.e., as compared to the I2C path between the BMC device 304 and the described below). As such, one of skill in the art in possession of the present disclosure will appreciate how the USB-NIC path establishment operations 600 may include any of a variety of operations that operate to provide the USB-NIC path described below between the BMC engine 310 and the GPU system controller 320 using the vNICs 310a and 320a, the USB connectors 306 and 316, and any couplings (e.g., traces, cabling, etc.) therebetween. As will be appreciated by one of skill in the art in possession of the present disclosure, the USB-NIC path may be established and available for communications between the BMC engine 310 and the GPU system controller 320 prior to the completion of the initialization operations for the computing device 300.

Figure 7A:
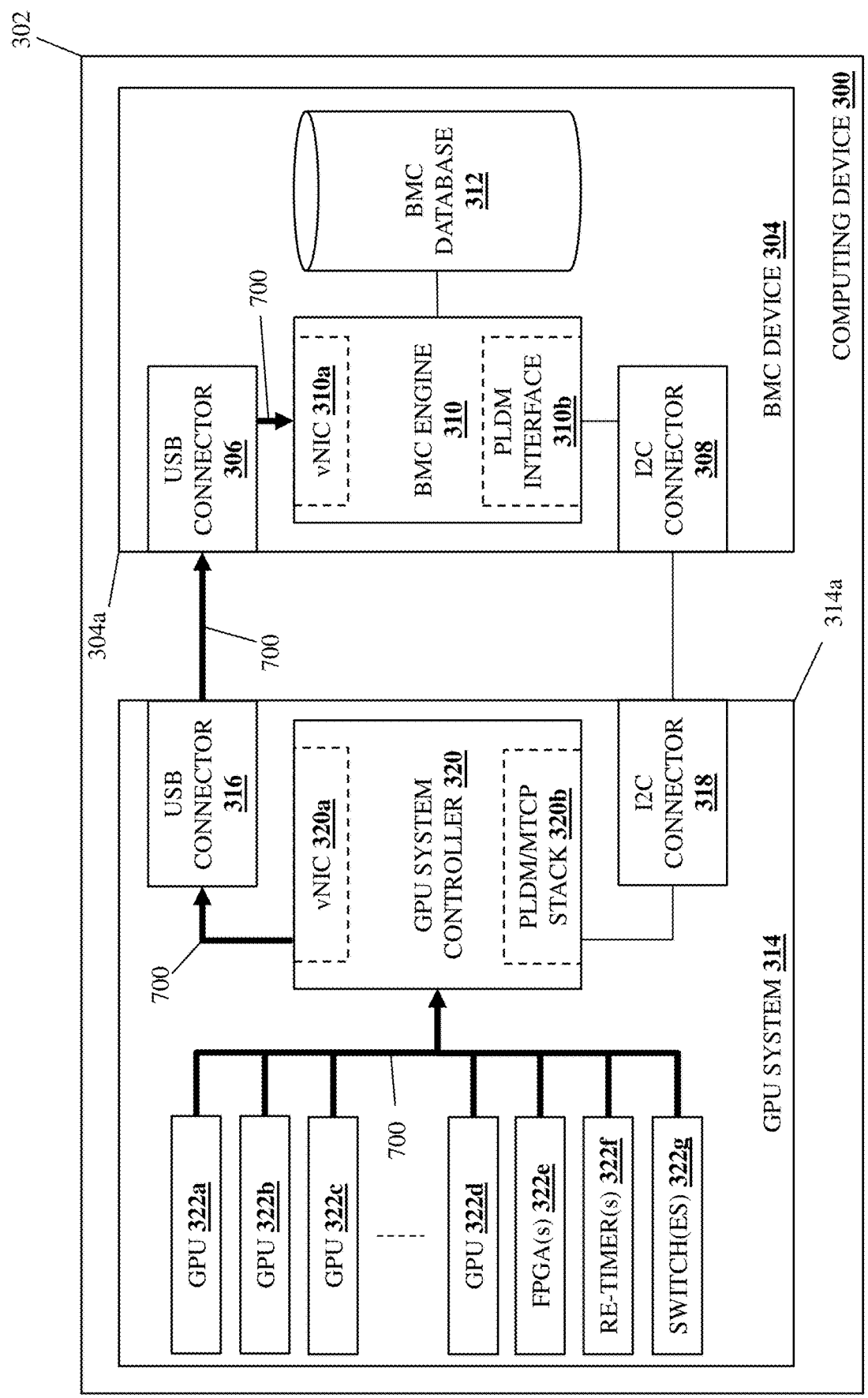
FIG. 7A is a schematic view illustrating an embodiment of the computing device of FIG. 2 operating during the method of FIG. 4.

The method 400 then proceeds to block 406 where the BMC device performs first log collection operations and inventory operations with the GPU system via the USB-NIC path during initialization of the computing device. With reference to FIG. 7A, in an embodiment of block 406, the BMC engine 310 in the BMC device 304 and the GPU system controller 320 in the GPU system 314 may perform first log collection operations and inventory operations 700 during the initialization operations for the computing device 300 that may include the GPU system controller 320 collecting log information (e.g., debug log information) and retrieving inventory information from any or all of the GPUs 322a-322d, the FPGA(s) 322e, the re-timer(s) 322f, the switch(es) 322g, and/or any other components in the GPU system 314. Furthermore, the first log collection operations and inventory operations 700 may also include the BMC engine 310 using the USB-NIC path (e.g., via Redfish protocol communications using the vNICs 310a and 320a, the USB connectors 306 and 316, and the couplings therebetween) to retrieve and/or receive the log information and inventory information from the GPU system controller 320.

As will be appreciated by one of skill in the art in possession of the present disclosure, in a specific example the first log collection operations and inventory operations 700 may be preceded by the registration of error events by the BMC engine 310 in the BMC device 304 with the GPU system controller 320 in the GPU system 314, with the first log collection operations including the collection of sensor and telemetry data from the GPUs 322a-322d that provides GPU debug log information, and the inventory operations including the retrieval of a device inventory for the GPU system 314 that includes identification information for a baseboard in the GPU system 314, each of the components in the GPU system 314, and/or any other GPU system inventory information that would be apparent to one of skill in the art in possession of the present disclosure. However, while a specific example of log collection and inventory operations (as well as other operations) has been described, one of skill in the art in possession of the present disclosure will appreciate how a variety of log collection and inventory operations will fall within the scope of the present disclosure as well.

The performance of the first log collection operations and inventory operations via the USB-NIC path during initialization operations for the computing device 300 provides substantial benefits over conventional systems that utilize an I2C path for log collection operations and inventory operations. As will be appreciated by one of skill in the art in possession of the present disclosure, the performance of such log collection operations and inventory operations via the I2C path is not available until the host provided by the computing device 300 (e.g., a host provided by a Central Processing Unit (CPU) in the computing device 300, not illustrated) is powered and/or otherwise available following its initialization (i.e., as the host is used to retrieve log information and inventory information via the I2C path and provide the results to the BMC device 304 in such conventional systems), while the USB-NIC path is available during initialization of the computing device 300 and even when the host provided by the computing device 300 is not powered and/or otherwise available, and provides for the log collection and inventory operations at much higher speeds than are available via the I2C path.

Figure 7B:
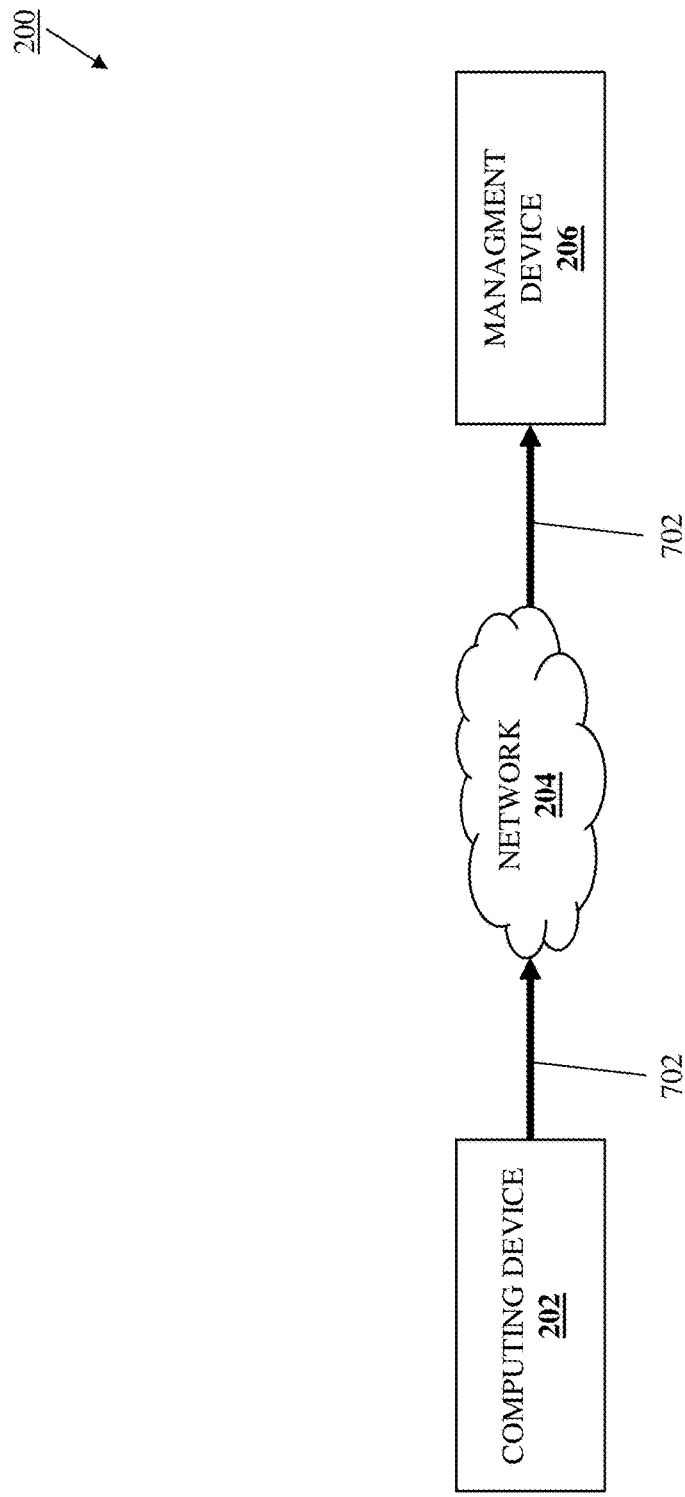
FIG. 7B is a schematic view illustrating an embodiment of the networked system of FIG. 2 operating during the method of FIG. 4.

With reference to FIG. 7B, in some embodiments of 406, the BMC engine 310 in the BMC device 304 included in the computing device 202/300 may perform monitoring/management information transmission operations 702 that may include transmitting the log information and inventory information that was collected/retrieved during the first log collection operations and inventory operations 700 via the network 204 and to the management device 206. As will be appreciated by one of skill in the art in possession of the present disclosure, the monitoring/management information transmission operations 702 may be performed during initialization of the computing device 202/300 to provide the log information and inventory information collected/retrieved during the first log collection operations and inventory operations 700 for display on the management device 206 in any of a variety of presentable formats known in the art, although the subsequent provisioning of the log information and inventory information for display on the management device 206 (e.g., during runtime of the computing device 202/300 following its initialization and in response to a log information/inventory information request from the management device 206) will fall within the scope of the present disclosure as well.

The method 400 then proceeds to decision block 408 where the method 400 proceeds depending on whether the computing device has entered a runtime state. As will be appreciated by one of skill in the art in possession of the present disclosure, the initialization operations for the computing device 202/300 may continue until they are completed, after which the computing device 202/300 will enter a runtime state in which, for example, an operating system is provided by a CPU in the computing device 202/300 and takes control of the computing device 202/300. As such, if at decision block 406 the computing device has not entered the runtime state, the method 400 returns to block 406 and loops until the computing device 202/300 completes initialization and enters the runtime state.

Figure 8:
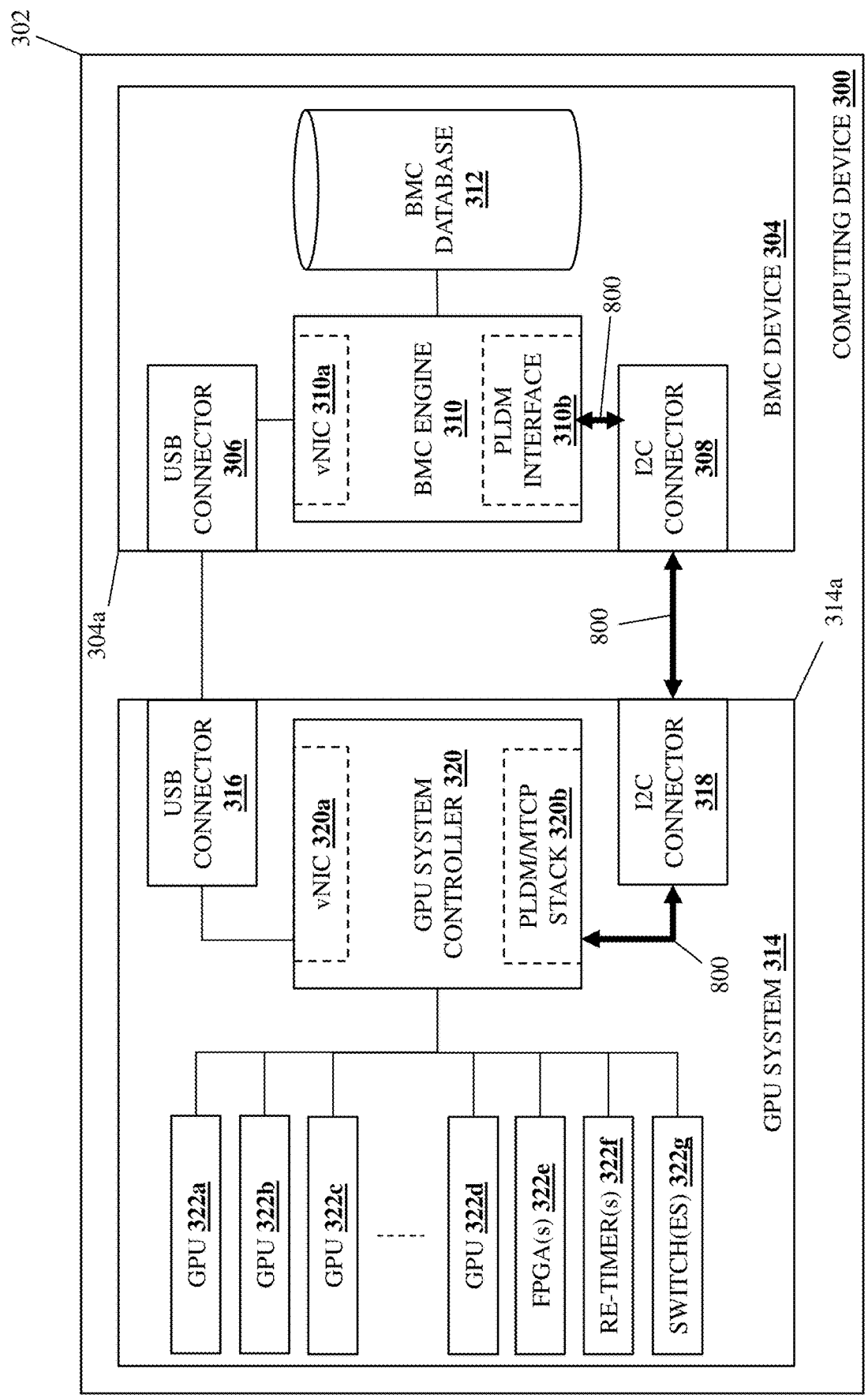
FIG. 8 is a schematic view illustrating an embodiment of the computing device of FIG. 2 operating during the method of FIG. 4.

If, at decision block 406, the computing device has entered the runtime state, the method 400 proceeds to block 410 where the BMC device and the GPU system establish an I2C path during runtime of the computing device. With reference to FIG. 8, in an embodiment of block 410 and in response to the computing device 300 entering runtime, the BMC engine 310 in the BMC device 304 and the GPU system controller 320 in the GPU system 314 may perform I2C path establishment operations 800 that may include the BMC engine 310 providing the PLDM interface 310b, the GPU system controller 320 providing the PDLM/MTCP stack 320b, and the BMC engine 310 and GPU system controller 320 configuring the PLDM interface 310b and PLDM/MTCP stack 320b, respectively, to provide the I2C path via the I2C connectors 308 and 318 that one of skill in the art in possession of the present disclosure will appreciate is a relatively "slow" communication path (i.e., relative to the USB-NIC path described above). As such, one of skill in the art in possession of the present disclosure will appreciate how the I2C path establishment operations 800 may include any of a variety of operations that operate to provide the I2C path described below between the BMC engine 310 and the GPU system controller 320 using the PLDM interface 310b and PLDM/MTCP stack 320b, the I2C connectors 308 and 318, and any couplings (e.g., traces, cabling, etc.) therebetween. As will be appreciated by one of skill in the art in possession of the present disclosure, the I2C path may be established and subsequently available for communications between the BMC engine 310 and the GPU system controller 320 for the remainder of the runtime of the computing device 300.

The method 400 then proceeds to block 412 where the BMC device switches from the USB-NIC path to the I2C path. In an embodiment, at block 412 and following the establishment of the I2C path during runtime of the computing device 202/300, the BMC engine 310 in the BMC device 304 of the computing device 300 may switch from the USB-NIC path that it utilized during initialization of the computing device 202/300 to the I2C path that was established at block 410 of the method 400, and one of skill in the art in possession of the present disclosure will appreciate how the switching from the use of the USB-NIC path to the use of the I2C path by the BMC engine 310 may utilize any of a variety of communication path switching techniques that would be apparent to one of skill in the art in possession of the present disclosure. Furthermore, one of skill in the art in possession of the present disclosure will appreciate how the switching from the USB-NIC path to the I2C path at block 412 will make other USB-NIC paths provided using the vNIC 310a and USB connector 306 available for use by the BMC engine 304 in monitoring and/or managing components in the computing device 202/300 (i.e., other than the GPU system 314) during runtime of the computing device 202/300.

Figure 9A:
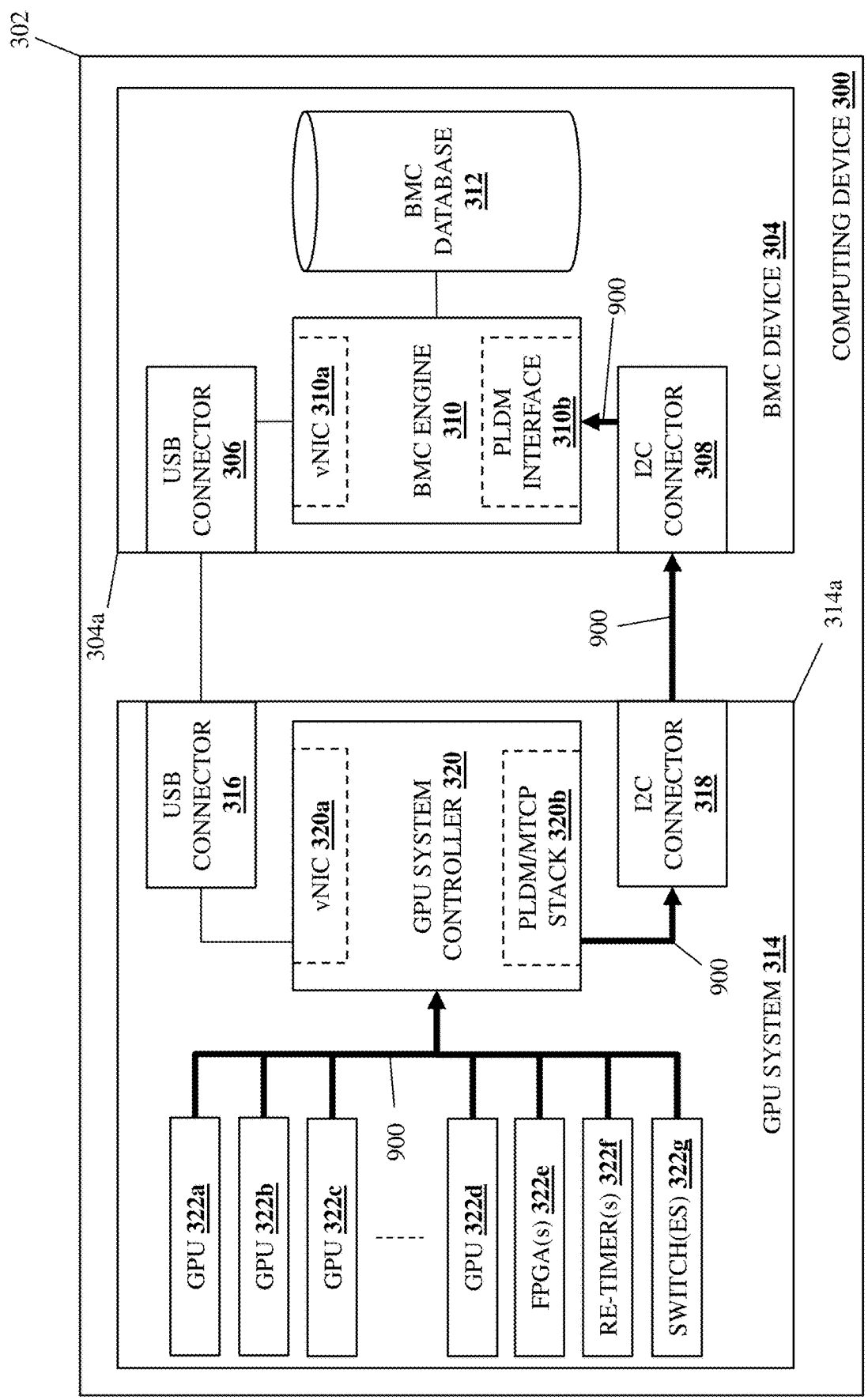
FIG. 9A is a schematic view illustrating an embodiment of the computing device of FIG. 2 operating during the method of FIG. 4.

The method 400 then proceeds to block 414 where the BMC device performs sensor monitoring operations with the GPU system via the I2C path during runtime of the computing device. With reference to FIG. 9A, in an embodiment of block 414, the BMC engine 310 in the BMC device 304 and the GPU system controller 320 in the GPU system 314 may perform sensor monitoring operations 900 during the runtime of the computing device 300 that may include the GPU system controller 320 collecting sensor information (e.g., error information) from any or all of the GPUs 322a-322d, the FPGA(s) 322e, the re-timer(s) 322f, the switch(es) 322g, and/or any other components in the GPU system 314. Furthermore, the sensor monitoring operations 900 may also include the BMC engine 310 using the I2C path (e.g., via PLDM protocol communications using the PLDM interface 310b and the PLDM/MTCP stack 320b, the I2C connectors 308 and 318, and the couplings therebetween) to retrieve and/or receive the sensor information from the GPU system controller 320.

In a specific example, the sensor monitoring operations 900 may include the monitoring of PLDM sensors in the GPUs 322a-322d, the FPGA(s) 322e, the re-timer(s) 322f, the switch(es) 322g, and/or any other components in the GPU system 314 that have been configured via the registration of error events by the BMC engine 310 in the BMC device 304 as described above to report those error events, and one of skill in the art in possession of the present disclosure will appreciate how the detection of such error events may trigger any of a variety of error handling operations including the retrieval of the second log information as described in further detail below.

Figure 9B:
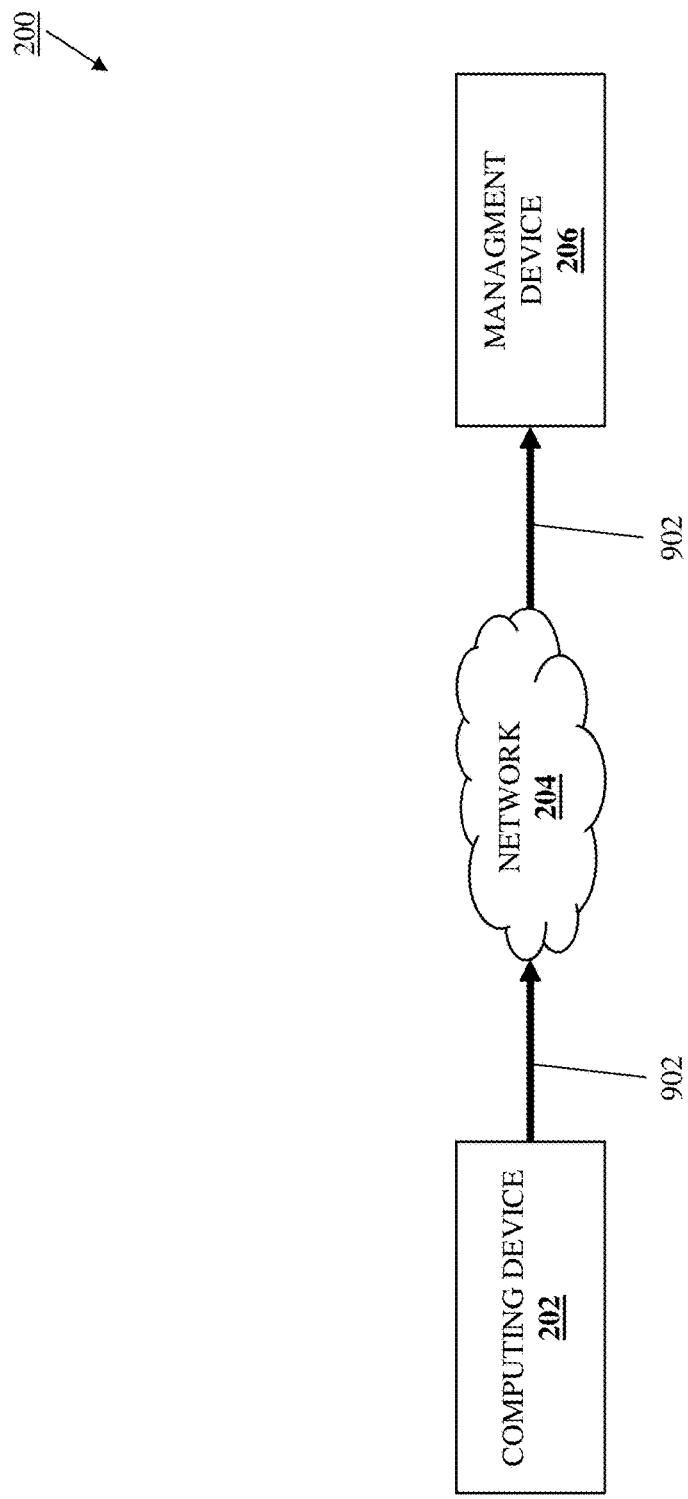
FIG. 9B is a schematic view illustrating an embodiment of the networked system of FIG. 2 operating during the method of FIG. 4.

With reference to FIG. 9B, in some embodiments of 406, the BMC engine 310 in the BMC device 304 included in the computing device 202/300 may perform monitoring/management information transmission operations 902 that may include transmitting the sensor information collected during the sensor monitoring operations 900 via the network 204 and to the management device 206. As will be appreciated by one of skill in the art in possession of the present disclosure, the monitoring/management information transmission operations 902 may be performed during runtime of the computing device 202/300 to provide the sensor information collected during the sensor monitoring operations 900 for display on the management device 206 in any of a variety of presentable formats (e.g., the identification of an error detected by a sensor) known in the art.

The method 400 then proceeds to decision block 414 where the method 400 proceeds depending on whether a second log information request is received. As discussed in further detail below, decision block 416 may be performed to provide second log information collected during the method 400 (discussed in further detail below) in response to a second log information request, and one of skill in the art in possession of the present disclosure will appreciate how no second log information has been collected yet in the embodiment of the method 400 currently being described. Thus, in this embodiment of decision block 414, a second log information request is not received, and the method 400 proceeds to decision blocks 418 and 426 illustrated in FIG. 4B. As will be appreciated by one of skill in the art in possession of the present disclosure, decision blocks 418 and 426 (and their respective subsequent blocks) may be performed separately or at the same time while remaining within the scope of the present disclosure. As such, while decision block 418 and its subsequent blocks are described prior to decision block 426 and its subsequent blocks, the simultaneous performance of those blocks, or the performance of those blocks in a different order, will fall within the scope of the present disclosure as well.

With reference to FIG. 4B, at decision block 418, the method 400 may proceed depending on whether a firmware update request is received. As will be appreciated by one of skill in the art in possession of the present disclosure, the management device 206 (e.g., a user, a scheduled application, etc.) may request firmware updates for the GPU system 314 and/or any of its components during runtime of the computing device 202/300, and thus the BMC engine 310 in the BMC device 304 may monitor for such firmware update requests. If, at decision block 418, no firmware update request is received, the method 400 returns to block 414. As such, during runtime of the computing device 202/300, the method 400 may loop such that the BMC device 304 performs the sensor monitoring operations discussed above with the GPU system 314 via the I2C path until a firmware update request is received.

If, at decision block 418, a first update request is received, the method 400 proceeds to block 420 where the BMC device switches from the I2C path to the USB-NIC path. With reference to FIG. 10A, in an embodiment of block 420, the management device 206 may perform firmware update request operations 1000 that include providing a firmware update request via the network 204 and to the BMC engine 310 in the BMC device 204 of the computing device 202/300. As will be appreciated by one of skill in the art in possession of the present disclosure, the firmware update request may include firmware and an instruction to provide the firmware on the GPU system 314 and/or any of its components, an instruction to retrieve firmware from any of a variety of locations known in the art and provide the firmware on the GPU system 314 and/or any of its components, and/or any of a variety of other firmware update request information that would be apparent to one of skill in the art in possession of the present disclosure.

In response to receiving the firmware update request, the BMC engine 310 in the BMC device 304 of the computing device 300 may switch from the I2C path that it is utilizing for the sensor monitoring operations 900 to the USB-NIC path, and one of skill in the art in possession of the present disclosure will appreciate how the switching from the use of the I2C path to the use of the USB-NIC path by the BMC engine 310 may utilize any of a variety of communication path switching techniques that would be apparent to one of skill in the art in possession of the present disclosure.

The method 400 then proceeds to block 422 where the BMC device performs firmware update operations with the GPU system via the USB-NIC path during runtime of the computing device. With reference to FIG. 10B, in an embodiment of block 422, the BMC engine 310 in the BMC device 304 and the GPU system controller 320 in the GPU system 314 may perform firmware update operations 1002 during runtime of the computing device 300 that may include the BMC engine 310 using the USB-NIC path (e.g., via Redfish protocol communications using the vNICs 310*a* and 320*a*, the USB connectors 306 and 316, and the couplings therebetween) to provide firmware (e.g., received in the firmware update request, retrieved in response to the firmware update request, etc.) to the GPU system controller 320.

Furthermore, the firmware update operations 1002 may also include the GPU system controller 320 installing the firmware received from the BMC engine 310, and while FIG. 10B illustrates the firmware being installed on each of the GPUs 322*a*-322*d*, the FPGA(s) 322*e*, the re-timer(s) 322*f*, the switch(es) 322*g*, one of skill in the art in possession of the present disclosure will appreciate how the firmware update operations performed by the GPU system controller 320 at block 422 may include the updating of firmware on the GPU system controller 320 and/or any of the components in the GPU system 314 while remaining within the scope of the present disclosure. As will be appreciated by one of skill in the art in possession of the present disclosure, upon completion of the firmware update, the GPU system controller 320 may provide a firmware update completion message to the BMC engine 310.

The method 400 then proceeds to block 424 where the BMC device switches from the USB-NIC path to the I2C path. In an embodiment, at block 424 and in response to completion of the firmware update (e.g., as indicated by the firmware update completion message discussed above), the BMC engine 310 in the BMC device 304 of the computing device 300 may switch from the USB-NIC path that was utilized for the firmware update operations 1002 to the I2C path, and one of skill in the art in possession of the present disclosure will appreciate how the switching from the use of the USB-NIC path to the use of the I2C path by the BMC engine 310 may utilize any of a variety of communication path switching techniques that would be apparent to one of skill in the art in possession of the present disclosure. Furthermore, one of skill in the art in possession of the present disclosure will appreciate how the switching from the USB-NIC path to the I2C path at block 424 will make other USB-NIC paths provided using the vNIC 310*a* and USB connector 306 available for use by the BMC engine 304 in monitoring and/or managing components in the computing device 202/300 (i.e.,, other than the GPU system 314) during runtime of the computing device 202/300.

The method 400 then returns to block 414. As such, the method 400 may loop during runtime of the computing device 300 such that the BMC device 304 performs the sensor monitoring operations discussed above with the GPU system 314 via the I2C path, while switching to the USB-NIC path and using that USB-NIC path to perform firmware update operations with the GPU system 314 when requested, and then switching back to the I2C path for use in the sensor monitoring operations with the GPU system 314.

With reference back to FIG. 4B, at decision block 426, the method 400 may proceed depending on whether the USB-NIC path is available. In an embodiment, at decision block 426, the BMC engine 310 in the BMC device 304 may periodically monitor the availability of the USB-NIC path during runtime of the computing device 202/300. As discussed above, the BMC engine 310 may utilize its vNIC 310*a* and the USB connector 306 to provide USB-NIC paths with components in the computing device 300 other than the GPU system 300, and thus the USB-NIC path provided between the BMC device 304 and the GPU system 314 may periodically be unavailable due to the use by the BMC engine 310 of a different USB-NIC path provided with a different components using its vNIC 310*a* and USB connector 306, and one of skill in the art in possession of the present disclosure will recognize that the BMC engine 310 may be configured to monitor for the availability of the USB-NIC path with the GPU system 314 (e.g., when BMC engine 310 is not using its vNIC 310*a* and USB connector 306 to monitor/manage another component via another USB-NIC path) using any of a variety of communication path availability monitoring techniques known in the art.

If, at decision block 426, the USB-NIC path is unavailable (e.g., when BMC engine 310 is using its vNIC 310*a* and USB connector 306 to monitor/manage another component via another USB-NIC path), the method 400 returns to block 414. As such, during runtime of the computing device 202/300, the method 400 may loop such that the BMC device 304 performs the sensor monitoring operations discussed above with the GPU system 314 via the I2C path until the USB-NIC path is available.

If, at decision block 426, the USB-NIC path is available, the method 400 proceeds to block 428 where the BMC device switches from the I2C path to the USB-NIC path. In an embodiment, at block 428 and in response to the USB-NIC path being available, the BMC engine 310 in the BMC device 304 of the computing device 300 may switch from the I2C path that it is utilizing for the sensor monitoring operations 900 to the USB-NIC path, and one of skill in the art in possession of the present disclosure will appreciate how the switching from the use of the I2C path to the use of the USB-NIC path by the BMC engine 310 may utilize any of a variety of communication path switching techniques that would be apparent to one of skill in the art in possession of the present disclosure.

Figure 11:
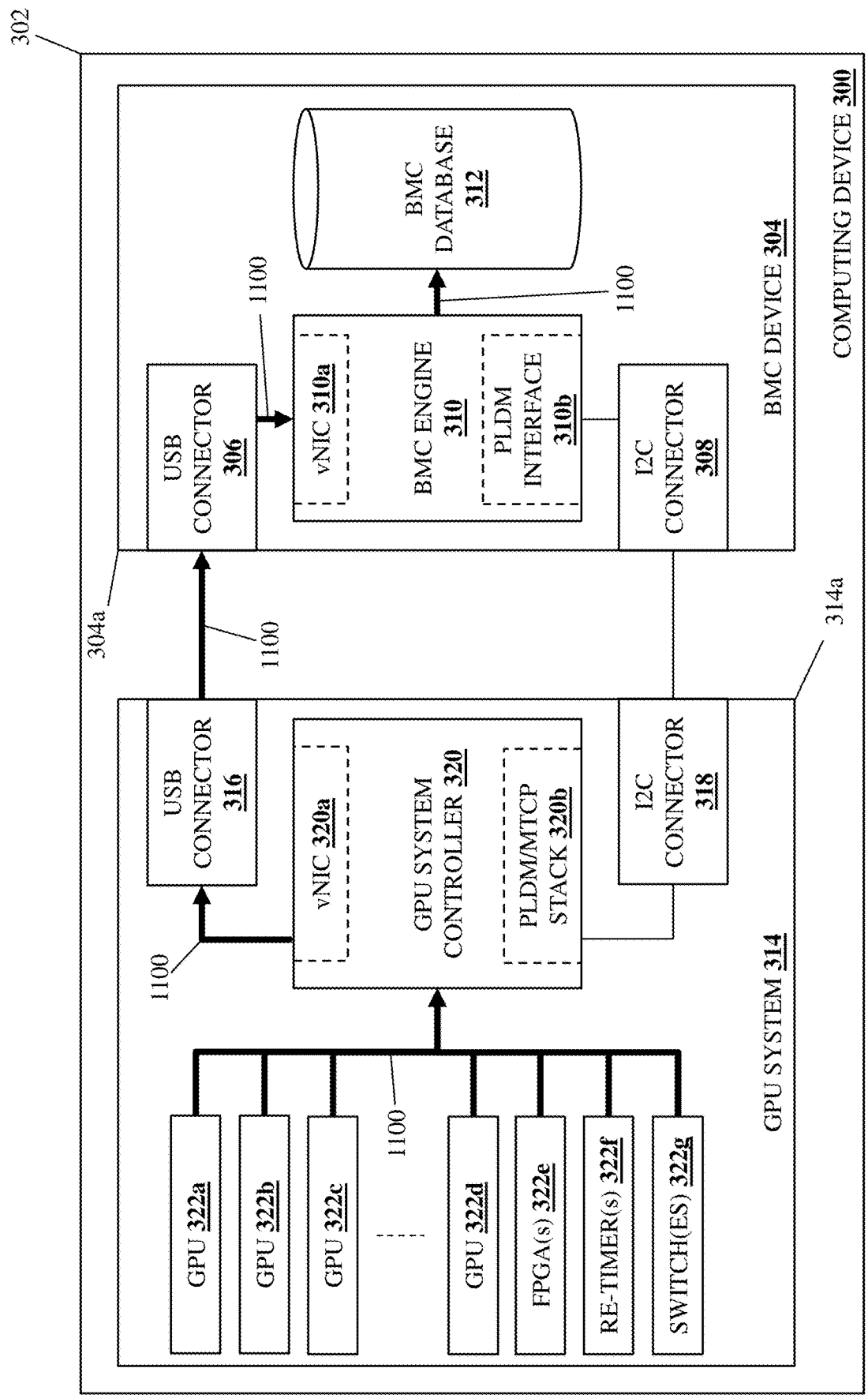
FIG. 11 is a schematic view illustrating an embodiment of the computing device of FIG. 2 operating during the method of FIG. 4.

The method 400 then proceeds to block 430 where the BMC device performs second log collection operations with the GPU system via the USB-NIC path during runtime of the computing device. With reference to FIG. 11, in an embodiment of block 430, the BMC engine 310 in the BMC device 304 and the GPU system controller 320 in the GPU system 314 may perform second log collection operations 1100 during the runtime of the computing device 300 that may include the GPU system controller 320 collecting log information (e.g., debug log information) from any or all of the GPUs 322*a*-322*d*, the FPGA(s) 322*e*, the re-timer(s) 322*f*, the switch(es) 322*g*, and/or any other components in the GPU system 314.

Furthermore, the second log collection operations 1100 also include the BMC engine 310 using the USB-NIC path (e.g., via the Redfish protocol communications using the vNICs 310*a* and 320*a*, the USB connectors 306 and 316, and the couplings therebetween) to retrieve and/or receive the log information from the GPU system controller 320, and store the log information in the BMC database 312, and one of skill in the art in possession of the present disclosure will appreciate how the BMC engine 310 may be configured to overwrite relatively older versions of the log information with relatively newer version (i.e., only a "current" version and a "next most recent" version of the log information may be stored in the BMC database 312). As will be appreciated by one of skill in the art in possession of the present disclosure, the collection of the relatively large amount of log information generated by the GPU system controller 320 will benefit from the faster communication speeds available via the USB-NIC path as compared to the I2C path.

As such, one of skill in the art in possession of the present disclosure will appreciate how the BMC engine 310 may periodically utilize the USB-NIC path to retrieve and store log information from the GPU system 314 during runtime of the computing device 300 when that USB-NIC path becomes available, and thus the second log collection operations may be "completed" when there is no further log information to collect, or when the USB-NIC path becomes unavailable because the BMC engine 310 must utilize the vNIC 310a and the USB connector 306 to monitor/manage another component via another USB-NIC path (e.g., with the second log collection operations being subsequently resumed once the USB-NIC path is once again available, and with this process being repeated until there is no further log information to collect). Such periodic log information collections may be performed on a schedule (i.e., when the availability of the USB-NIC path permits), in response to a user confirming a request to perform those log information collections, and/or using any other periodic log information collection techniques that would be apparent to one of skill in the art in possession of the present disclosure.

Furthermore, while the second log collection operations are described above as occurring when the USB-NIC path is available, as discussed above error events detected during the sensor monitoring operations performed at block 414 may trigger the second log collection operations as well. As such, in some embodiments the second log collection operations may be performed in response to error events and using the USB-NIC path when the USB-NIC path is available, while using the I2C path when the USB-NIC is not available. However, in other embodiments, the detection of error events may cause the BMC engine 310 to make the USB-NIC path available, and then use that USB-NIC path to perform the second log collection operations.

The method 400 then proceeds to block 432 where the BMC device switches from the USB-NIC path to the I2C path. In an embodiment, at block 432 and in response to completion of the second log collection operations 1100, the BMC engine 310 in the BMC device 304 of the computing device 300 may switch from the USB-NIC path that was utilized for the second log collection operations 1100 to the I2C path, and one of skill in the art in possession of the present disclosure will appreciate how the switching from the use of the USB-NIC path to the use of the I2C path by the BMC engine 310 may utilize any of a variety of communication path switching techniques that would be apparent to one of skill in the art in possession of the present disclosure. Furthermore, one of skill in the art in possession of the present disclosure will appreciate how the switching from the USB-NIC path to the I2C path at block 432 will make other USB-NIC paths provided using the vNIC 310a and USB connector 306 available for use by the BMC engine 304 in monitoring and/or managing components in the computing device 202/300 (i.e., other than the GPU system 314) during runtime of the computing device 202/300.

The method 400 then returns to block 414. As such, the method 400 may loop during runtime of the computing device 300 such that the BMC device 304 performs the sensor monitoring operations discussed above with the GPU system 314 via the I2C path, while switching to the USB-NIC path and using that USB-NIC path to perform second log collection operations with the GPU system 314 when the USB-NIC path is available, and then switching back to the I2C path for use in the sensor monitoring operations with the GPU system 314 when the USB-NIC path is unavailable (or there is no log information to collect).

Figure 12B:
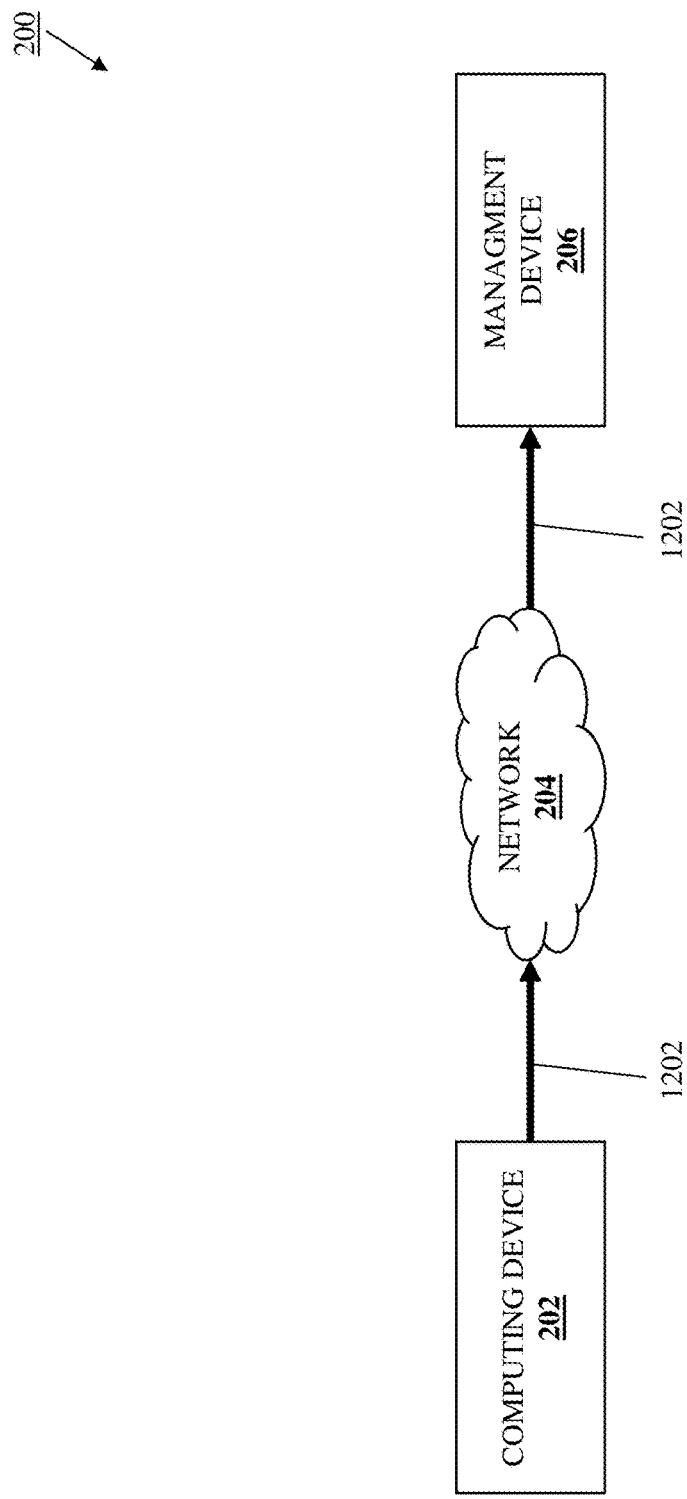
FIG. 12B is a schematic view illustrating an embodiment of the networked system of FIG. 2 operating during the method of FIG. 4.

If, at decision block 416, a second log information request is received, the method 400 proceeds to block 434 where the BMC device transmits log information. With reference to FIG. 12A, in an embodiment of decision block 416, the management device 206 may perform second log information request operations 1200 that include transmitting a second log information request via the network 204 and to the BMC engine 310 in the BMC device 304 of the computing device 300. With reference to FIG. 12B, in response to receiving the second log information request, the BMC engine 310 may retrieve the second log information that was stored in the BMC database 312 at part of the second log collection operations 1100 (e.g., a "current" version and a "next most recent" version of the log information stored in the BMC database 312 to provide a comprehensive dataset for issue analysis), and provide that second log information via the network 204 and to the management device 206. Following block 434, the method 400 may proceed to decision blocks 418 and 426 similarly as described above.

Thus, systems and methods have been described that provide for the combined use of a USB-NIC path and an I2C path in the management of a GPU system by a BMC device, with the USB-NIC path used for first log collection operations and inventory operations during initialization, the I2C path used for sensor monitoring operations during runtime, the USB-NIC path used for second log collection operations during runtime, and the USB-NIC path used for firmware update operations during runtime when a firmware update request is received. For example, the BMC/multi-GPU monitoring/management system may include a computing device having a GPU system with a plurality of GPUs, and a BMC device coupled to the GPU system via a USB-NIC path and an I2C path. The BMC device performs first log collection operations and inventory operations via the USB-NIC path with the GPU system during initialization of the computing device. During runtime of the computing device that follows the initialization of the computing device, the BMC device performs sensor monitoring operations with the GPU system via the I2C path. During runtime of the computing device, the BMC device performs second log collection operations with the GPU system via the USB-NIC path, and will perform firmware update operations with the GPU system via the USB-NIC path in response to receiving a firmware update request. As such, the USB-NIC path between the BMC device and the GPU system is utilized to enhance the monitoring and management of the GPU system by the BMC device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Baseboard Management Controller (BMC)/multi-Graphics Processing Unit (GPU) monitoring/management system, comprising:
   a computing device;

a Graphics Processing Unit (GPU) system that is included in the computing device and that includes a plurality of GPUs; and a Baseboard Management Controller (BMC) device that is included in the computing device, that is coupled to the GPU system via a Universal Serial Bus-Network Interface Controller (USB-NIC) path and an Inter-Integrated Circuit (I2C) path, and that is configured to:

perform, during initialization of the computing device via the USB-NIC path, first log collection operations and inventory operations with the GPU system;

perform, during runtime of the computing device following the initialization of the computing device and via the I2C path, sensor monitoring operations with the GPU system;

perform, during runtime of the computing device via the USB-NIC path and in response to receiving a firmware update request, firmware update operations with the GPU system; and perform, during runtime of the computing device via the USB-NIC path, second log collection operations with the GPU system.

2. The system of claim 1, wherein the BMC device is configured to:

switch, in response to entering runtime of the computing device subsequent to the initialization of the computing device, from the USB-NIC path to the I2C path.

3. The system of claim 1, wherein the BMC device is configured to:

switch, in response to receiving the firmware update request, from the I2C path to the USB-NIC path; and switch, in response to completing the firmware update operations, from the USB-NIC path to the I2C path.

4. The system of claim 1, wherein the BMC device is configured to:

determine that the second log collection operations should be performed;

switch, in response to determining that the second log collection operations should be performed, from the I2C path to the USB-NIC path; and switch, in response to completing the second log collection operations, from the USB-NIC path to the I2C path.

5. The system of claim 4, wherein the BMC device is configured to:

determine that the USB-NIC path is not currently being used and, in response, determine that the second log collection operations should be performed.

6. The system of claim 1, wherein the BMC device is configured to:

receive a second log information request; and transmit, in response to the second log information request, log information collected during the second log collection operations.

7. An Information Handling System (IHS), comprising:

a processing system; and a memory system that is coupled to the processing system and that includes instructions that, when executed by the processing system, cause the processing system to provide a Baseboard Management Controller (BMC) engine that is configured to:

perform, during initialization of a computing device that includes the processing system and via a Universal Serial Bus-Network Interface Controller (USB-NIC) path, first log collection operations and inventory operations with a Graphics Processing Unit (GPU) system that is included in the computing device, that is coupled to the processing system, and that includes a plurality of GPUs;

perform, during runtime of the computing device following the initialization of the computing device and via an Inter-Integrated Circuit (I2C) path, sensor monitoring operations with the GPU system;

perform, during runtime of the computing device via the USB-NIC path and in response to receiving a firmware update request, firmware update operations with the GPU system; and perform, during runtime of the computing device via the USB-NIC path, second log collection operations with the GPU system.

8. The IHS of claim 7, wherein the BMC engine is configured to:

switch, in response to entering runtime of the computing device subsequent to the initialization of the computing device, from the USB-NIC path to the I2C path.

9. The IHS of claim 7, wherein the BMC engine is configured to:

switch, in response to receiving the firmware update request, from the I2C path to the USB-NIC path; and switch, in response to completing the firmware update operations, from the USB-NIC path to the I2C path.

10. The IHS of claim 7, wherein the BMC engine is configured to:

determine that the second log collection operations should be performed;

switch, in response to determining that the second log collection operations should be performed, from the I2C path to the USB-NIC path; and switch, in response to completing the second log collection operations, from the USB-NIC path to the I2C path.

11. The IHS of claim 10, wherein the BMC engine is configured to:

determine that the USB-NIC path is not currently being used and, in response, determine that the second log collection operations should be performed.

12. The IHS of claim 7, wherein the BMC engine is configured to:

collect, during the second log collection operations, log information; and store the second log collection operations.

13. The IHS of claim 12, wherein the BMC engine is configured to:

receive a second log information request; and transmit, in response to the second log information request, the log information.

14. A method for monitoring/managing multiple Graphics Processing Units (GPUs) using a Baseboard Management Controller (BMC) device, comprising:

performing, by a Baseboard Management Controller (BMC) device during initialization of a computing device that includes the BMC device and via a Universal Serial Bus-Network Interface Controller (USB-NIC) path, first log collection operations and inventory operations with a Graphics Processing Unit (GPU) system that is included in the computing device and that includes a plurality of GPUs;

performing, by the BMC device during runtime of the computing device following the initialization of the computing device and via an Inter-Integrated Circuit (I2C) path, sensor monitoring operations with the GPU system;

performing, by the BMC device during runtime of the computing device via the USB-NIC path and in response to receiving a firmware update request, firmware update operations with the GPU system; and performing, by the BMC device during runtime of the computing device via the USB-NIC path, second log collection operations with the GPU system.

15. The method of claim 14, further comprising:

switching, by the BMC device in response to entering runtime of the computing device subsequent to the initialization of the computing device, from the USB-NIC path to the I2C path.

16. The method of claim 14, further comprising:

switching, by the BMC device in response to receiving the firmware update request, from the I2C path to the USB-NIC path; and switching, by the BMC device in response to completing the firmware update operations, from the USB-NIC path to the I2C path.

17. The method of claim 14, further comprising:

determining, by the BMC device, that the second log collection operations should be performed;

switching, by the BMC device in response to determining that the second log collection operations should be performed, from the I2C path to the USB-NIC path; and switching, by the BMC device in response to completing the second log collection operations, from the USB-NIC path to the I2C path.

18. The method of claim 17, further comprising:

determining, by the BMC device, that the USB-NIC path is not currently being used and, in response, determining that the second log collection operations should be performed.

19. The method of claim 14, further comprising:

collecting, by the BMC device during the second log collection operations, log information; and storing, by the BMC device, the second log collection operations.

20. The method of claim 19, further comprising:

receiving, by the BMC device, a second log information request; and transmitting, by the BMC device in response to the second log information request, the log information.

* * * * *